Figure 1:
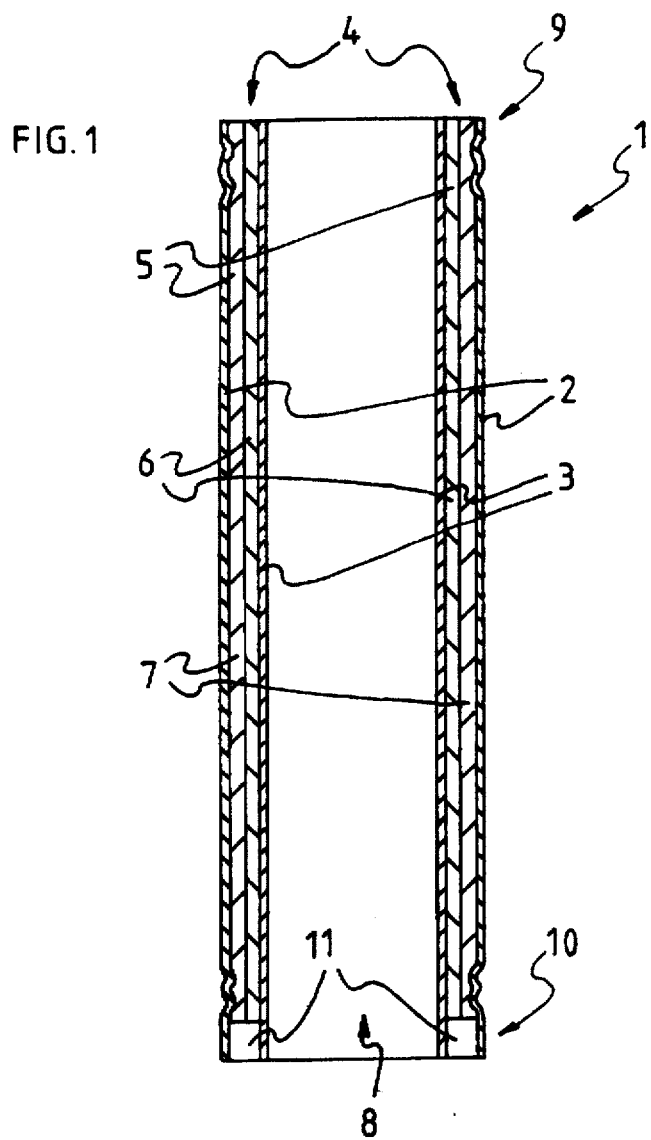

United States Patent [19]

Stouten

[11] Patent Number: 5,755,265

[45] Date of Patent: May 26, 1998

[54] DISCHARGE PIPE FOR DISCHARGING HOT SUBSTANCES

[75] Inventor: Willem F. Stouten, Swifterbant, Netherlands

[73] Assignee: Stoutenbourg Beheer B.V., Netherlands

[21] Appl. No.: 793,272

[22] PCT Filed: Sep. 22, 1995

[86] PCT No.: PCT/NL95/00319

§ 371 Date: Mar. 4, 1997

§ 102(e) Date: Mar. 4, 1997

[87] PCT Pub. No.: WO96/10147

PCT Pub. Date: Apr. 4, 1996

[30] Foreign Application Priority Data

Sep. 26, 1994 [NL] Netherlands .................... 9401567

[51] Int. Cl.[6] ........................................ F16L 9/14
[52] U.S. Cl. ................................ 138/149; 138/155
[58] Field of Search ............................. 138/149, 155, 138/172, 175, 178

[56] References Cited

U.S. PATENT DOCUMENTS 1,709,844  4/1929  Durant .......................... 138/92 X
4,130,140  12/1978  Cerny et al. ....................... 138/149
5,186,217  2/1993  Kallinich et al. .................. 138/149

Primary Examiner—Paul C. Lewis
Attorney, Agent, or Firm—Brooks & Kushman P.C.

[57] ABSTRACT

Discharge pipe for discharging hot substances, which discharge pipe consists of an outer pipe, and an inner pipe placed coaxially inside the outer pipe, the inner pipe and the outer pipe enclosing a space, which is filled up with insulating means. The insulating means consist of a first layer (7) of compressible material surrounding the outside of the inner pipe (3), and a second layer (6) of concrete with very good thermal insulating properties which surrounds the first layer (7) and is surrounded by the outer pipe (2). The inner layer (7) consists of compressible material with high thermal insulation properties, such as ceramic wool. The discharge pipe is made up of several lengths of pipe (1), the successive lengths of pipe being fixed to each other by means of fixing means (13), and a compressible layer (12) of material with good thermal insulating properties, being placed between the contact faces of two successive lengths of pipe.

5 Claims, 2 Drawing Sheets

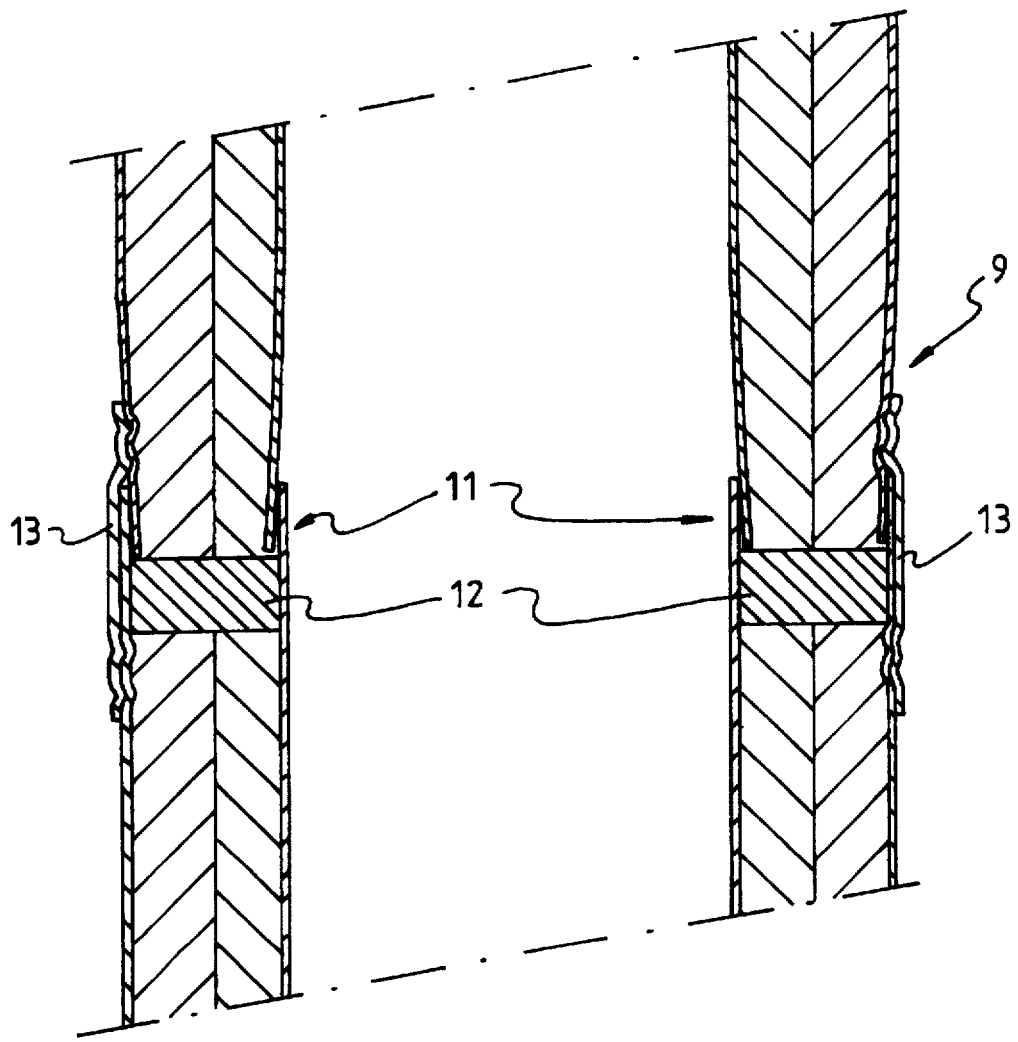

DISCHARGE PIPE FOR DISCHARGING HOT SUBSTANCES

The invention relates to a discharge pipe for discharging hot substances, which discharge pipe consists of an outer pipe, and an inner pipe placed coaxially inside the outer pipe, the inner pipe and the outer pipe enclosing a space, which space contains two concentric layers of different material, the first layer surrounding the outside of the inner pipe and the second layer surrounding the first layer and which second layer is surrounded on the outside by the outer pipe.

From the U.S. Pat. No. 1,709,844 a discharge pipe is known, which pipe is covered by insulating means so the pipe can be laid in the ground and discharge hot and cold liquids or gases such as hot steam or liquids and cool brine, ammonia or other liquids which are at a temperature lower than that of the surrounding earth. The insulating means consists of a first layer which can be any approved insulating material, such as air-cell, wool felt, magnesia or cork chips. The second layer consists of a fluent self-hardening material such as asphalt. This known discharge pipe is especially designed to be used with substances with a temperature lower than about 100° C. and can not be used to carry gases and liquids with a temperature above 100° C. such as flue gasses with a temperature over 1000° C. In that case a very thick first layer would be needed to prevent the second layer of asphalt to become too hot. The first layer is of thermally insulating material and is needed to prevent that the asphalt layer will be heated above the melting temperature of asphalt, which is considerably lower than 100° C. However, the thickness of the heat-insulating material of the first layer depends on what temperature the substances can reach and on the maximum permissible outer wall temperature of the first layer. It has been found that such discharge pipes must be surrounded by a very thick first layer of insulating material, if materials flow through the pipes with a temperature far above 100° C., in order that the outside temperature of the first layer will not reach the melting temperature of asphalt. This makes such pipes very expensive, and they have an undesirably large external diameter.

If such discharge pipes are used for chimneys, the discharge pipes must meet all kinds of regulations. For example, in some areas there are standards in which the temperature at the outside of a chimney flue must not rise more than 75° C. if hot combustion gases at a temperature of about 1000° C. are discharged For a certain short period through the discharge pipe or chimney, or if hot combustion gases at a temperature of about 600° C. are discharged for a period of three hours. If insulating materials such as ceramic wool are used, the external dimensions of the discharge pipe or chimney then become too large. However, if insulating materials such as concrete, which could have much better heat-insulating properties, are used, with the result that the external dimensions of a discharge pipe can be reduced to within desired dimensions, yet other problems then emerge. The inside of the discharge pipe ought to be gastight and must therefore be, for example, a smooth, thin metal pipe. However, such a metal inner pipe has a different coefficient of expansion from the layer of insulating concrete, with the result that the inner pipe cannot expand and can consequently buckle, bend and even crack.

The object of the invention is a discharge pipe for hot substances such as combustion gases, in which the outer wall of the discharge pipe will not rise above a desired temperature which is in general lower than 100° C. if very hot substances are conveyed through the discharge pipe, and of which the external dimension of the pipe is much smaller than usually until now. Another object of the invent on is a discharge pipe with an inner pipe which is surrounded by a insulating layer which is made of a material with very high thermal insulating properties of which the coefficient of expansion is smaller than the coefficient of expansion of the inner pipe.

This object of the invention is achieved with a discharge pipe wherein the second layer is made of concrete and wherein the first layer surrounding the inner pipe is compressible to such extent that the inner pipe can freely expand in the radial direction. These measures make it possible that pipes could be manufactured using concrete, such as insulating concrete with extremely good thermal insulating properties but with a very small coefficient of expansion, what makes that the external diameter of the discharge pipe could be made much smaller than was possible until now, and that the inner surface is formed by an inner pipe or wall which can expand freely in the radial direction, so that buckling is prevented. It has been found that different types of concrete can currently be manufactured, which concrete has very good heat-insulating properties, what makes that the insulating layer surrounding the flue can be kept very thin-walled. The present invention makes it also possible that parts of pipes could be made in a factory and be built up on the spot. It is of course of no importance whether the inner and outer pipes are circular as it is possible to use square, elliptical or cylindrical shapes, or a combination of these shapes. This makes it possible to use, for example, a metal inner wall, with the result that the substances to be conveyed cannot penetrate through the wall of the discharge pipe.

In a preferred embodiment both the inner pipe and the outer pipe are cylindrical, thereby enclosing a cylindrical space. This is the most economic design of such a discharge pipe.

It has been found that it is preferable to use as the first or inner layer insulating means which have high thermal insulating properties, such as ceramic wool, as a result of which the heat insulation of the pipe can be improved and the external dimensions can consequently be smaller than if a compressible material with low heat-insulating properties, but a lower purchase price is used.

In a preferred embodiment the discharge pipe is made up of several lengths of pipe placed on each other, the successive lengths of pipe being fixed to each other by means of fixing means, and a layer of compressible material with good thermal insulating properties, such as ceramic wool, being placed between the contact faces of two successive lengths of pipe. This makes it possible to transport the pipe in parts and then assemble it on site, and it has been found that the coupling faces of two successive lengths of pipe can be fixed to each other so well that, through the use of a layer of ceramic wool between the contact faces, very little or no heat leakage occurs. Heat leakage can be prevented even better if the insulating layer consists of a compound which is sprayed between the contact faces after the making of the connection between the lengths of pipe.

Figure 2:
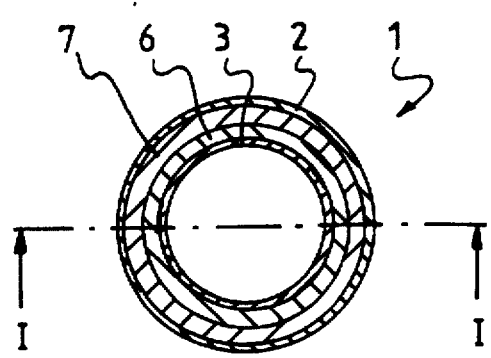

The invention will be explained in greater detail with reference to the drawing, in which:

FIG. 1: shows a length of pipe according to the invention in longitudinal section along the line I—I of FIG. 2;

FIG. 2: shows a top view of a length of pipe according to FIG. 1;

FIG. 3: shows a connection between two lengths of pipe according to FIGS. 1 and 2.

FIG. 1 shows a longitudinal section of a length of pipe 1. The length of pipe 1 is made up of an outer pipe 2 and an inner pipe 3 placed therein. An annular space 4 is situated between the outer pipe 2 and the inner pipe 3. An insulating layer 5 is placed in the annular space. The insulating layer 5 consists of an inner layer of compressible insulating material 6, such as ceramic wool or a ceramic blanket, and an outer layer of rigid insulating material 7, such as insulating concrete. The layer of compressible insulating material 6 is placed around the outside of the inner pipe 3. The layer 7 of rigid insulating material is placed on the inside of the outer pipe 2. The inner pipe 3 encloses a flue 8, through which hot gases can flow. At one of the two ends the insulating layer 5 runs through to the end 9 of the length of pipe 1, and at the other side the internal space between the two pipes, the inner pipe 2 and the outer pipe 3, is not completely filled with insulating material, so that an empty annular space 10 is left. At the other end 11 of the length of pipe 1 the ends of the inner pipe and of the outer pipe slant slightly towards each other, so that the wall of the end 11 is slightly narrower than the wall of the remainder of the length of pipe 1. FIG. 2 shows a top view of the same length of pipe 1.

FIG. 3 shows how two lengths of pipe 1 are coupled to each other. An annular layer of compressible insulating material 12 is first placed in the annular space 10 of the end 9 of a first length of pipe, before the two pipes are placed on each other and fixed to each other. The end 11 with the narrowed wall of a second length of pipe is then pushed into the empty annular space 10. The end 11 of the top pipe presses on the annular insulating layer 12 of ceramic wool, with the result that the latter is compressed. The compressible and thermally insulating properties of the annular insulating layer 12 mean that no heat leakage will occur between the two lengths of pipe. Clamping means 13, in the form of a generally known clamping strip connection, are placed around the joint. The annular insulating layer 12 can be, for example, insulating wool which is cut into an annular shape beforehand. However, the layer 12 can also be an injectable insulating and heatproof compound. Such an injectable compound seals better and prevents heat leakages more effectively.

I claim:

1. Discharge pipe (1) for discharging hot substances, which discharge pipe consists of an outer pipe (2), and an inner pipe (3) placed coaxially inside the outer pipe, the inner pipe and the outer pipe enclosing a space, which space contains two concentric layers of different material, the first layer (6) surrounding the outside of the inner pipe (3) and the second layer (7) surrounding the first layer (6) and which second layer is surrounded on the outside by the outer pipe characterized in that the second layer (7) is made of concrete and that the first layer (6) surrounding the inner pipe (3) is compressible to such extent that the inner pipe can freely expand in the radial direction.

2. Discharge pipe according to claim 1 characterized in that the first layer (6) consists of a layer of compressible material with high thermal insulation properties.

3. Discharge pipe according to one of claims 1 or 2 characterized in that the first layer (6) is ceramic wool.

4. Discharge pipe according to one of claims 1 or 2 characterized in that the discharge pipe is made up of several lengths of pipe (1) having contact faces, adjacent lengths of said pipe being fixed to each other by fixing means (13), and a compressible layer (12) of material with good thermal insulating properties being placed between the contact faces of said adjacent lengths of pipe.

5. Discharge pipe according to claim 4 characterized in that the first layer (6) is ceramic wool.

* * * * *